US012604092B2

(12) United States Patent
Wantz

(10) Patent No.: US 12,604,092 B2
(45) Date of Patent: Apr. 14, 2026

(54) AUTOMATED DEVICE FOR DRILL CUTTINGS IMAGE ACQUISITION

(71) Applicant: Schlumberger Technology Corporation, Sugar Land, TX (US)

(72) Inventor: Francois Wantz, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 61 days.

(21) Appl. No.: 18/722,297

(22) PCT Filed: May 31, 2023

(86) PCT No.: PCT/US2023/023915
§ 371 (c)(1),
(2) Date: Jun. 20, 2024

(87) PCT Pub. No.: WO2023/235343
PCT Pub. Date: Dec. 7, 2023

(65) Prior Publication Data
US 2024/0388797 A1 Nov. 21, 2024

(30) Foreign Application Priority Data
May 31, 2022 (EP) ..................................... 22305792

(51) Int. Cl.
*H04N 23/667* (2023.01)
*G06V 10/143* (2022.01)
(Continued)

(52) U.S. Cl.
CPC ......... *H04N 23/667* (2023.01); *G06V 10/143* (2022.01); *G06V 10/26* (2022.01);
(Continued)

(58) Field of Classification Search
CPC ...... H04N 23/667; H04N 23/61; H04N 23/10; H04N 23/56; G06V 10/143; G06V 10/82; G06V 10/26; G06V 10/764
See application file for complete search history.

(56) References Cited

U.S. PATENT DOCUMENTS

2016/0370274 A1 12/2016 Rowe
2017/0298726 A1 10/2017 Smith
(Continued)

FOREIGN PATENT DOCUMENTS

CN 201826835 U * 5/2011
CN 107462562 A * 12/2017 ............. G01N 21/84

OTHER PUBLICATIONS

Daniela Becerra, Generating a labeled data set to train machine learning algorithms for lithologic classification of drill cuttings, published online May 25, 2022, https://doi.org/10.1190/int-2021-0194.1 (Year: 2022).*
(Continued)

*Primary Examiner* — Rowina J Cattungal
(74) *Attorney, Agent, or Firm* — Kyle R. Miiller

(57) ABSTRACT

An automated image acquisition device includes a housing including an image acquisition chamber. A tray is deployed in the image acquisition chamber and is configured to receive a drill cuttings sample. At least one light is also deployed in the image acquisition chamber and is disposed to illuminate the tray. A digital camera is deployed in the image acquisition chamber and is configured to acquire a digital image (e.g., a digital color image) of the cuttings sample. The device further includes an electronic controller configured to instruct the digital camera to record a digital image of the drill cuttings and save the image to digital memory or transfer the image to an external computing device.

20 Claims, 5 Drawing Sheets

(51) Int. Cl.

| | |
|---|---|
| *G06V 10/26* | (2022.01) |
| *G06V 10/764* | (2022.01) |
| *G06V 10/82* | (2022.01) |
| *H04N 23/10* | (2023.01) |
| *H04N 23/56* | (2023.01) |
| *H04N 23/61* | (2023.01) |

(52) U.S. Cl.
    CPC ............ *G06V 10/764* (2022.01); *G06V 10/82* (2022.01); *H04N 23/10* (2023.01); *H04N 23/56* (2023.01); *H04N 23/61* (2023.01)

(56) References Cited

U.S. PATENT DOCUMENTS

| | | | |
|---|---|---|---|
| 2020/0149394 A1 | 5/2020 | Hao | |
| 2021/0319257 A1 | 10/2021 | Francois | |
| 2022/0120168 A1 | 4/2022 | Katterbauer | |
| 2023/0122264 A1* | 4/2023 | Ruel .................. | G01N 15/1429 |
| | | | 382/103 |

OTHER PUBLICATIONS

Imatest, Rez Checker target from Imatest, www.imatest.com/product/rez-checker/, 3 pages, 2024.

* cited by examiner

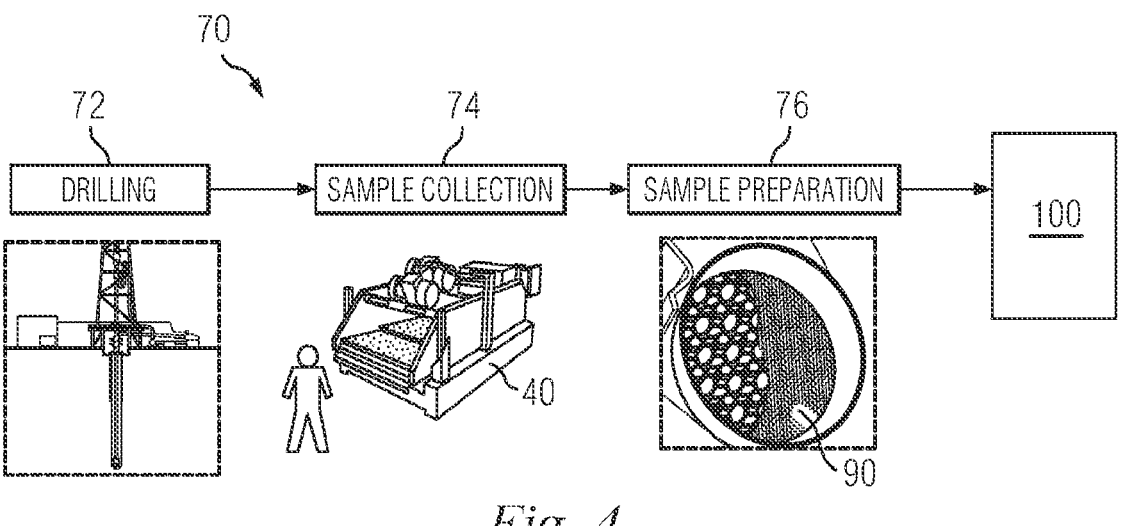
*Fig. 4*
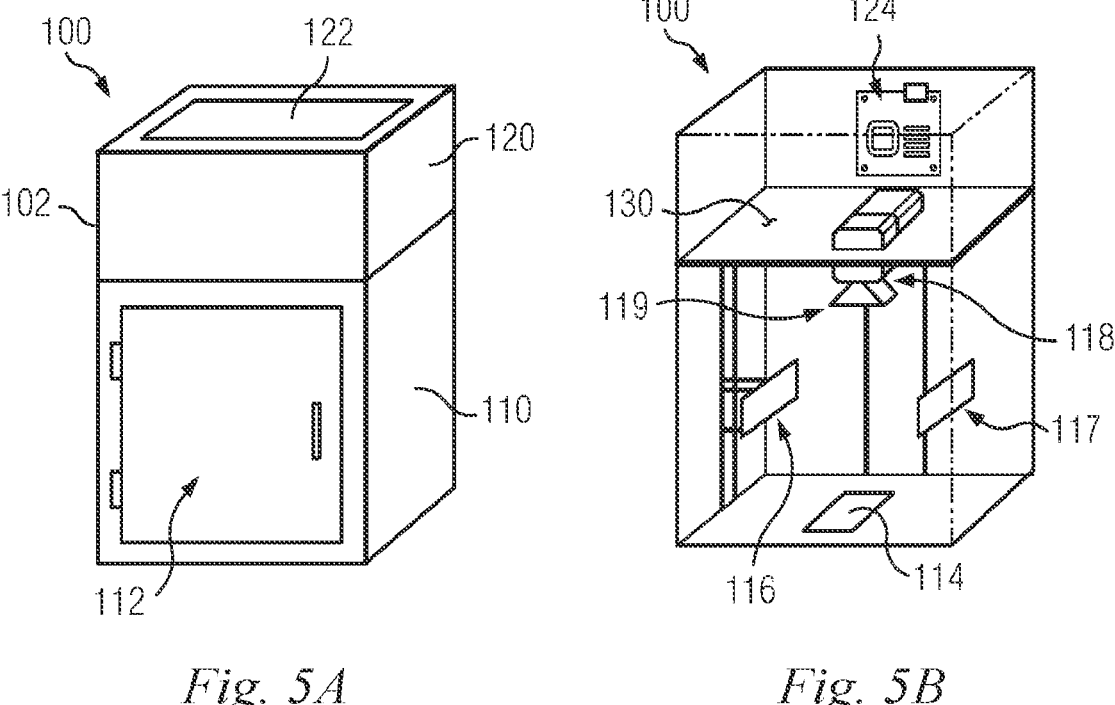
*Fig. 5A*                    *Fig. 5B*

140

160

AUTOMATED DEVICE FOR DRILL CUTTINGS IMAGE ACQUISITION

CROSS REFERENCE TO RELATED APPLICATIONS

This application is a National Stage Entry of International Application No. PCT/US2023/023915, filed May 31, 2023, which claims priority to European Patent Application No. 22305792.8, which was filed on May 31, 2022, and is incorporated herein by reference in its entirety.

BACKGROUND

In subterranean drilling operations, such as for oil and gas exploration and production, formation cuttings are generated by the drilling activity. These cuttings have long been evaluated and characterized to better understand the properties and structure of subsurface rock. The cuttings are commonly collected after passing the shale shakers, then cleaned and photographed for analysis. In recent years, there has been a desire to perform such evaluation and characterization automatically (or semi-automatically) to reduce human cost and shorten the turnaround time of the interpretation. However, implementing such automation is far from routine.

Electronic image data is commonly obtained and evaluated manually during conventional drilling operations. Automatic evaluation and characterization of such data is particularly challenging since the cuttings include a wide variety of sizes, shapes, textures, and colors. Moreover, the cuttings are commonly jumbled together in the image with individual particles touching and partially overlapping one another. Image lighting also tends to vary from image to image and rig to rig with shadowing and other image artifacts making the evaluation and characterization more challenging. There is a need to improve image quality and the consistency of cuttings images in order to improve the effectiveness of automated machine learning algorithms to more accurately segment and label drill cuttings images.

BRIEF DESCRIPTION OF THE DRAWINGS

For a more complete understanding of the disclosed subject matter, and advantages thereof, reference is now made to the following descriptions taken in conjunction with the accompanying drawings, in which:

FIG. 4 depicts an example process for obtaining cuttings images.

FIGS. 5A and 5B (collectively FIG. 5) depict one example embodiment of an automated image acquisition device.

DETAILED DESCRIPTION

Figure 1:
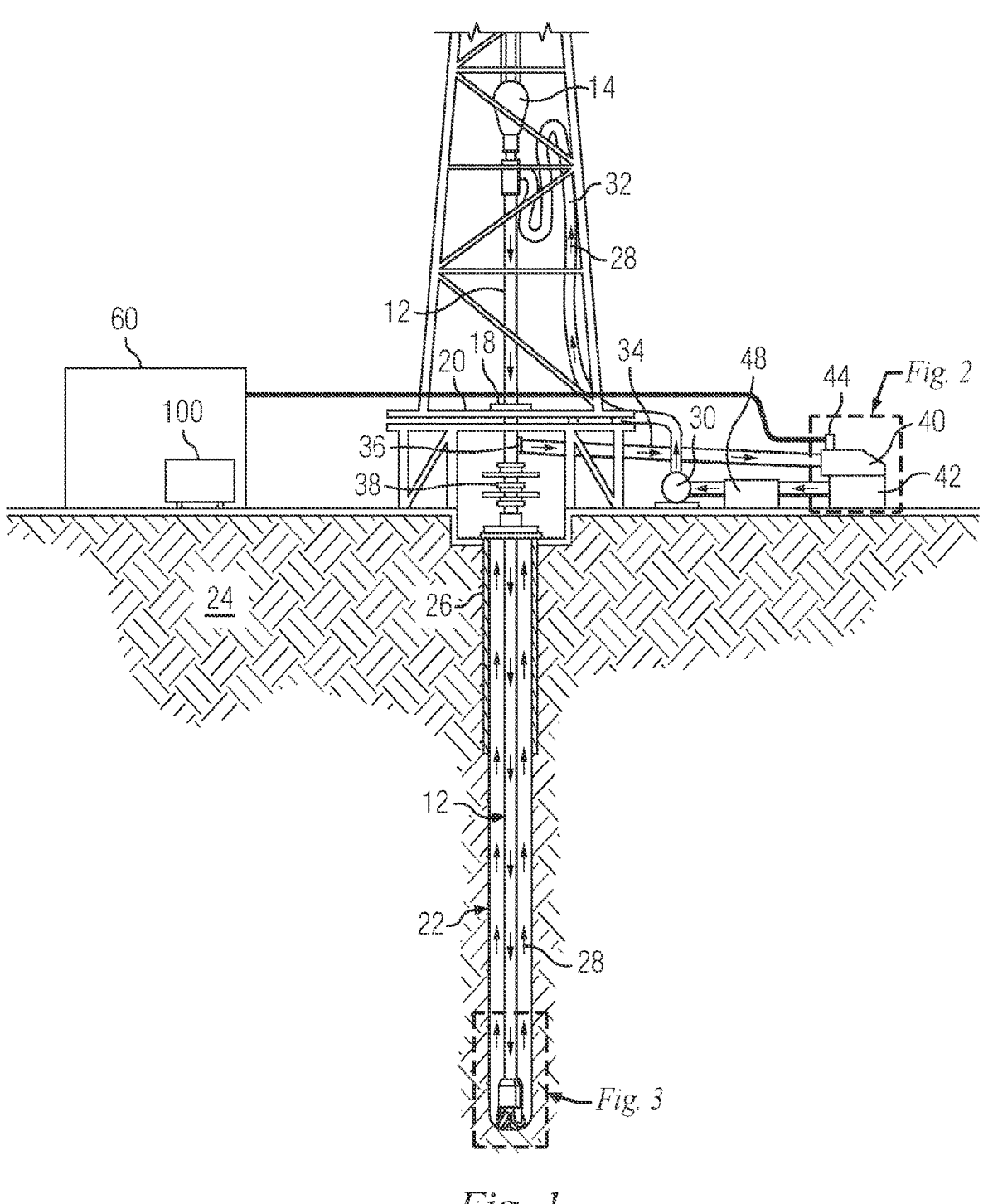
FIG. 1 depicts an example drilling rig including a system for acquiring digital photographic images of drill cuttings samples.

An automated image acquisition device for acquiring digital photographic images of drill cuttings samples is disclosed. The disclosed embodiments may advantageously improve the quality and consistency of the acquired images as well as provide for automated or semi-automated calibration of the device. In one example embodiment, the device includes a housing including an image acquisition chamber. A tray is deployed in the image acquisition chamber and is configured to receive the drill cuttings sample. At least one light is also deployed in the image acquisition chamber and is disposed to illuminate the tray. A digital camera is deployed in the image acquisition chamber and is configured to acquire a digital image (e.g., a digital color image) of the cuttings sample. The device further includes an electronic controller configured to automatically turn the light on and off, instruct the digital camera to record the digital photographic image of the drill cuttings when the light is on, and save the image to digital memory or transfer the image to an external computing device.

As known to those of ordinary skill, drilling a subterranean borehole (e.g., in oil and gas exploration and/or production operations) generates a large volume of rock cuttings that are available at the rig site. In current drilling operations, these cuttings are commonly evaluated by geologists, petrophysicists, and/or other experts at the rig site, for example, to evaluate local lithology and the oil bearing potential of the well. The cuttings description and evaluation are generally a manual and repetitive task performed at the rig site. A commonly implemented workflow involves rig personnel identifying each lithology type by visual examination and performing chemical and/or physical measurements on cuttings samples. Upon identifying the lithology types in the cuttings sample(s), the operator describes the rock characteristics (color, hardness, grain size, etc.), for example, on paper. Photographs (digital images) may also be visually evaluated based on prior measurements and experience.

With the rise of image datasets in recent years, as well as advances in machine learning (ML), attempts have been made to automatically perform cuttings identification utilizing ML algorithms. Such attempts have included performing classification of cuttings from photographic images of drilling cuttings (e.g., using a trained convolutional neural network). While such efforts have been extensive, they have had only limited success. One particular difficulty has been accurately labeling multiple rock types within a single image, such as may appear during a transition from one lithology to another during drilling. A related difficulty has been accurately identifying a change from one lithology type to another in successive images (as can also happen when transitioning from one lithology type to another during drilling). These difficulties may be related, in part, to quality and consistency issues with the acquired cuttings images.

FIG. 1 depicts an example drilling rig 10 including an apparatus 100 configured to automatically acquire cuttings images generated during the drilling operation. The apparatus may be deployed on the rig, for example, in an onsite laboratory 60. In the depicted embodiment, a drill string 12 may be suspended at an upper end by a kelly 12 and a traveling block 14 and terminate at a lower end at a drill bit 16. The drill string 12 and the drill bit 16 may be rotated, for example, by a rotary table 18 on a driller floor 20, thereby drilling a borehole (wellbore) 22 into an earth formation 24, where a portion of the borehole 22 may be cased by a casing 26. As illustrated, in certain embodiments, drilling fluid or drilling "mud" 28 may be pumped by a mud pump 30 into the upper end of the hollow drill string 12 through a connecting mud line 32. From there, the drilling fluid 28 may flow downward through the drill string 12, exiting the drill string 12 through openings in the drill bit 16, and may return to the surface by way of an annulus formed between the wall of the borehole 22 and an outer diameter of the drill string 12. Once at the surface, the drilling fluid 28 may return through a return flow line 34, for example, via a bell nipple 36. As illustrated, in certain embodiments, a blowout preventer 38 may be used to prevent blowouts from occurring in the drilling operation 10.

Figure 2:
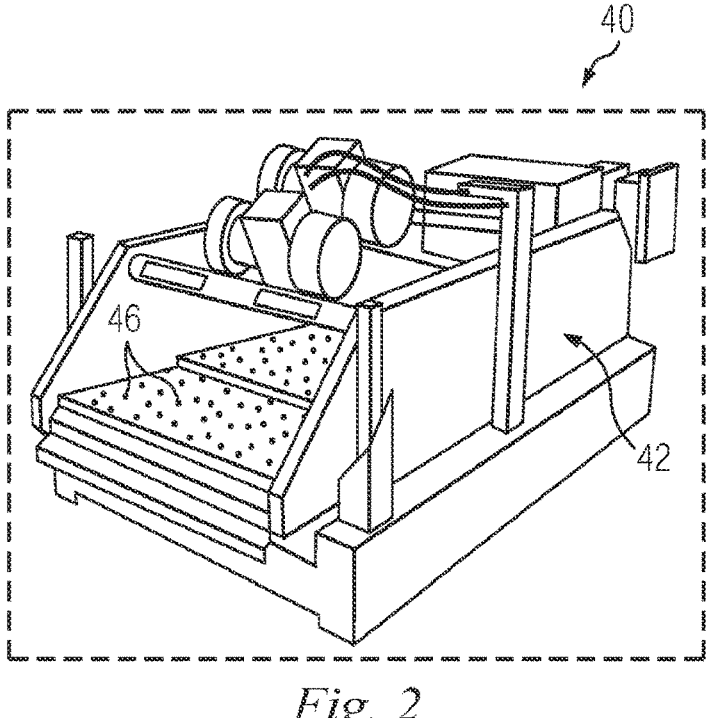
FIG. 2 depicts an example apparatus configured to remove drill bit cuttings from the drilling fluid in use in the rig depicted on FIG. 1.
Figure 3:
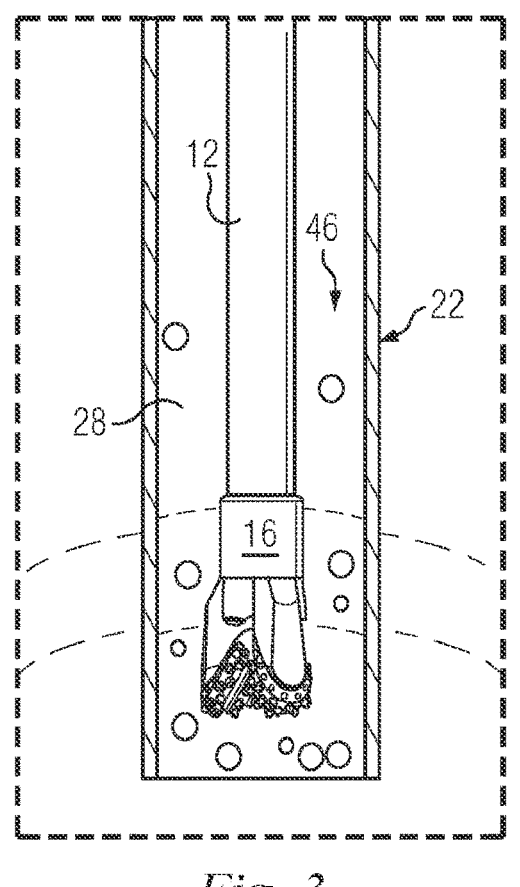
FIG. 3 depicts an example drill bit generating drill bit cuttings in use in the rig depicted on FIG. 1.

As further depicted on FIG. 1, drill bit cuttings that are formed by the drill bit 16 crushing rocks in the formation 24 may be removed from the returned drilling fluid 28 by a shale shaker 40 in the return flow line 34. The drilling fluid 28 may be reused and recirculated downhole. The shale shaker 40 may include a shaker pit 42 and a gas trap 44. FIG. 2 depicts drill bit cuttings 46 that have been removed from the drilling fluid 28 in the shaker pit 42 of the shale shaker 40 before the drilling fluid 28 is delivered to a mud pit 48. Moreover, FIG. 3 depicts cuttings flowing up through the borehole annulus after being generated by drill bit 16 during drilling.

Turning now to FIG. 4, an example process 70 for obtaining cuttings images is depicted. A borehole is drilled at 72, for example, using the rig equipment described above with respect to FIG. 1. The drilling operation generates cuttings as also described above. The cuttings are collected at 74, for example, from a shale shaker 40, as described with respect to FIG. 2. In example embodiments the cuttings may be prepared for analysis at 76, for example, by drying in an oven and/or sieving or meshing the cuttings (e.g., as shown at 90) to remove large or small particles. A sample of the acquired cuttings may then be placed in an image acquisition device 100 that may be configured to automatically acquire at least one photographic image of the cuttings (e.g., first and second images illuminated with corresponding white light and ultraviolet light).

FIGS. 5A and 5B (collectively FIG. 5) depict external and internal views of image acquisition device 100 (also referred to herein as image acquisition system 100). In certain embodiments, the device 100 may be a portable instrument and may be configured for use at substantially any suitable location at a rig site (e.g., in a modular laboratory or adjacent the shale shaker 40 or other surface system or rig components). In the example embodiment depicted, the device 100 includes an external housing 102. The housing is intended to protect internal components (e.g., a camera and other electronic circuitry) and to provide a controllable environment for image acquisition. The housing may be fabricated from substantially any suitable construction material, such as sheet metal, plastic, etc. The disclosed embodiments are, of course, not limited in this regard.

The depicted example includes first and second chambers 110, 120, including a lower image acquisition chamber 110 and an upper service chamber 120. The image acquisition chamber 110 includes a door or hatch 112 (or access way) that provides access to the chamber 110. The hatch 112 may include seals or flashing (not shown) to provide for better control of the image acquisition environment. The service chamber 120 may also include a hatch 122 that provides service access to various electronic (and other) components in the device 100.

Turning to FIG. 5B, the image acquisition chamber 110 may include a sample tray 114 configured to receive the cuttings (e.g., as depicted in FIG. 4). The device 100 may include substantially any suitable tray, for example, including a plastic or metal tray having a high contrast (vivid) background color to enhance later particle identification and segmentation in the acquired images. The tray may be sized and shaped (in coordination with a camera lens system) to hold a sufficient quantity of cuttings and to fill a field of view in an image acquisition device.

The chamber 110 may further include at least one light source, for example, including a white light source 116 and/or an ultraviolet light source 117 configured to illuminate the sample tray 114 (and cuttings placed on the tray). The light sources 116, 117 may include, for example, a light emitting diode (LED) or other light sources. In certain embodiments, the white light source 116 may be configured to automatically turn on when the device 100 is powered up or to automatically turn on when the hatch 112 is opened to provide internal lighting for an operator. In the example embodiment depicted, the light sources 116, 117 are deployed on opposing interior walls of the chamber 110. The disclosed embodiments are not limited in this regard as the light sources 116, 117 may be deployed in substantially any suitable location or locations in the chamber 110 (e.g., above the tray).

The chamber 110 may further include a camera 118 and a corresponding lens 119 deployed above the tray 114, for example, mounted on or in a divider 130 disposed between the upper and lower chambers 120, 110. The camera may advantageously include a high resolution color camera, for example, including a 10 or 20 (or more) megapixel image sensor. Substantially any suitable lens 119 may be utilized. The lens 119 may be configured to provide sharp (focused) images to the image sensor, for example, including a 25 mm lens. The lens 119 may alternatively include a variable zoom lens. In certain embodiments, the camera 118 and corresponding lens 119 may be advantageously deployed in or on the divider 130, such that the lens extends downward into and may be accessed from the lower chamber 110 and the camera electronics and connection port(s) is/are disposed in and may be accessed from the upper chamber 120.

With continued reference to FIG. 5B, the upper chamber 120 may include a controller 124 such as a computer board (or motherboard) configured to control operation of the camera 118, the lens 119, and/or the lights 116, 117. The controller 124 may include one or more processors (e.g., microprocessors) which may be connected to one or more data storage devices (e.g., hard drives or solid state memory). The controller may be configured to network (e.g., communicate) with external devices, for example, via a hard wire or wireless connection. For example, the controller 124 may be configured to upload acquired images to a local (rig-site) computer and/or to a cloud based computing system. The controller 124 may further include processor executable instructions stored in memory. As described in more detail below with respect to FIGS. 6, 7, and 8 the instructions may be configured to cause the device 100 to automatically calibrate the image acquisition system, acquire at least one cuttings image, to process the image, and/or to upload the image to an external computer system.

The controller may further be configured to provide external access to internal software or firmware stored in controller memory. Such external access (e.g., via a hard wire USB connection or via a wireless connection) may enable the software to be repaired and/or updated as needed via an external computer. In one example embodiment, the software may be stored on flash memory and updated or repairing the software may include copying the software from an external computer (or other device) to the flash memory.

While not depicted on FIG. 5, it will be understood that the image acquisition device 100 may further include a user interface in communication with controller 124. The user interface may include standard devices such as a keyboard, a mouse, and/or a display. The user interface may also (or alternatively) include a mobile phone or tablet based interface. The user interface may, for example, enable a user to enter metadata related to a cuttings sample or group of cuttings samples, such as a lagged depth, a wellbore ID, a date, a time, and/or the like. It will be appreciated that the user interface may be dedicated to the device or may be independent of the device 100 (e.g., associated with rig site computer). For example, the user interface may be associated with a cell phone, a tablet, a laptop, or other computerized device in communication with the controller 124. The disclosed embodiments are not limited in this regard.

Figure 6:
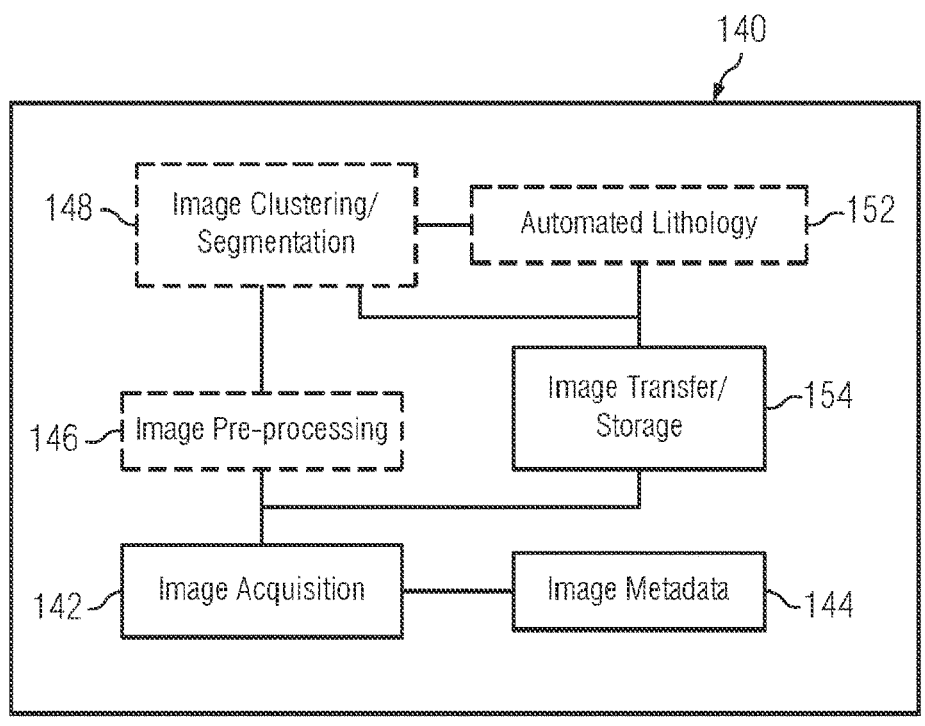
FIG. 6 depicts a block diagram of an example software module including a plurality of instruction blocks stored in controller memory in the device shown on FIG. 5.

FIG. 6 depicts a block diagram of an example software module 140 including a plurality of instruction blocks stored in controller memory. The software module 140 may include image acquisition instructions 142 configured to automatically acquire digital images of the drill cuttings samples. The image acquisition instructions may be further configured to automatically calibrate the image acquisition system, for example, including the camera, lens, and lighting settings. An image metadata block 144 may be configured to receive image metadata and associate the received data with an acquired image. Block 144 may be further configured to query a user, for example, via a suitable user interface.

The software module may optionally further include one or more image processing blocks 146, 148, and 152. For example, an image pre-processing block 146 may be configured to calibrate or standardize the images, via color enhancement/calibration, cropping, filtering, etc. An image clustering or segmentation block 148 may be configured to generate a segmented image that identifies, highlights, and/or labels individual cuttings particles in the image. The clustering or segmenting may be conducted using any suitable algorithm, for example, including a trained neural network such as a pixel by pixel convolution neural network (CNN) or other artificial intelligence and/or machine learning algorithms. In certain embodiments, the algorithm may be configured to merely segment the image (e.g., to highlight individual particles and distinct lithology types). In other embodiments, the algorithm may be configured to assign a preliminary lithology type label to the identified clusters (which may then be verified or corrected by an expert at the off-site location).

In embodiments having sufficient computer processing power (e.g., multiple processors), the software module 140 may further include an automated lithology block 152 configured to label the individual cuttings particles that were identified by the image segmentation block with a label including a lithology type (e.g., sandstone, limestone, shale, etc.). The automated lithology block 152 may include, a trained neural network such as a trained convolutional neural network (CNN). Such a CNN may be trained using a large number of annotated or labeled images, for example, of cuttings images including various lithology types from around the world or from the local basin (field or region). The training may result in weight optimization of the NN nodes and layers based on minimizing a loss function for the training dataset. In other words, the weights of each node in the multilayer NN may be tuned so that the model minimizes the errors when classifying the input images (or a smaller subset thereof). It will be appreciated that such CNNs generally include multiple layers and that the initial training is intended to train each of the layers (e.g., each of the nodes in each of the layers is assigned a weight to minimize the loss function). The initial training may require large computing resources and may therefore be advantageously conducted offsite, for example, using an initial training database and may then be transferred to the controller 140.

With continued reference to FIG. 6, the software module furthers include an image transfer and/or storage routine 154 configured to transfer image data to an external computer system and/or to save the image to local memory. The routine 154 may be configured to transfer the image using any suitable hardware connection, for example, including a hardwired or wireless connection. The routine 154 may also be configured to transfer substantially any suitable image data, for example, including raw image data from block 142, preprocessed image data from block 146, clustered or segmented image data from block 148, and/or segmented lithology interpretation image data from block 152.

Figure 7:
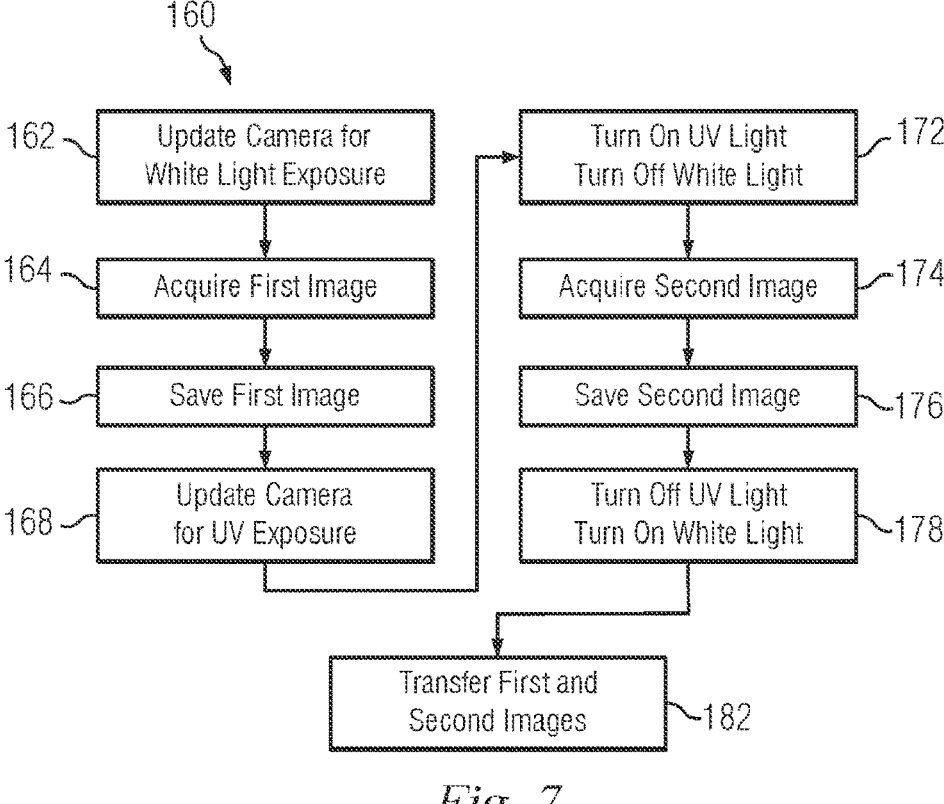
FIG. 7 depicts a flow chart of one example method for acquiring digital images using the image acquisition block shown on FIG. 6.

Turning now to FIG. 7, and with further reference to FIG. 5, a flow chart of one example method 160 for acquiring digital images is disclosed, e.g., using image acquisition block 142 (FIG. 6). The method 160 assumes that a cuttings sample, for example, prepared as described above with respect to FIG. 4, has been placed on tray 114 in the image acquisition chamber 110. In this particular example, the camera settings are updated to configure the sensor for a white light exposure at 162. These settings may include a white balance, a particular exposure time, etc. A first image is acquired at 164 and saved to controller memory at 166. The camera settings are then updated to configure the sensor for an ultraviolet exposure at 168. The ultraviolet light 117 is then turned on and the white light 116 is turned off at 172. A second image is acquired at 174 and saved to controller memory at 176. The ultraviolet light is then turned off and the white light turned on at 178. The first and second images are transferred to external computer resources for further processing at 182. Such further processing may include, for example, clustering, segmenting, and automated lithology as described above. Image metadata may be entered at any time, for example, before, during, or after execution of the method 160. Moreover, while not depicted on FIG. 7, it will be understood that the image acquisition block 142 may be further configured to automatically lock the lower hatch 112 when an image acquisition routine is initiated and to unlock the hatch 112 when the routine is completed (e.g., when the images have been transferred or when the UV light 117 has been turned off).

Figure 8:
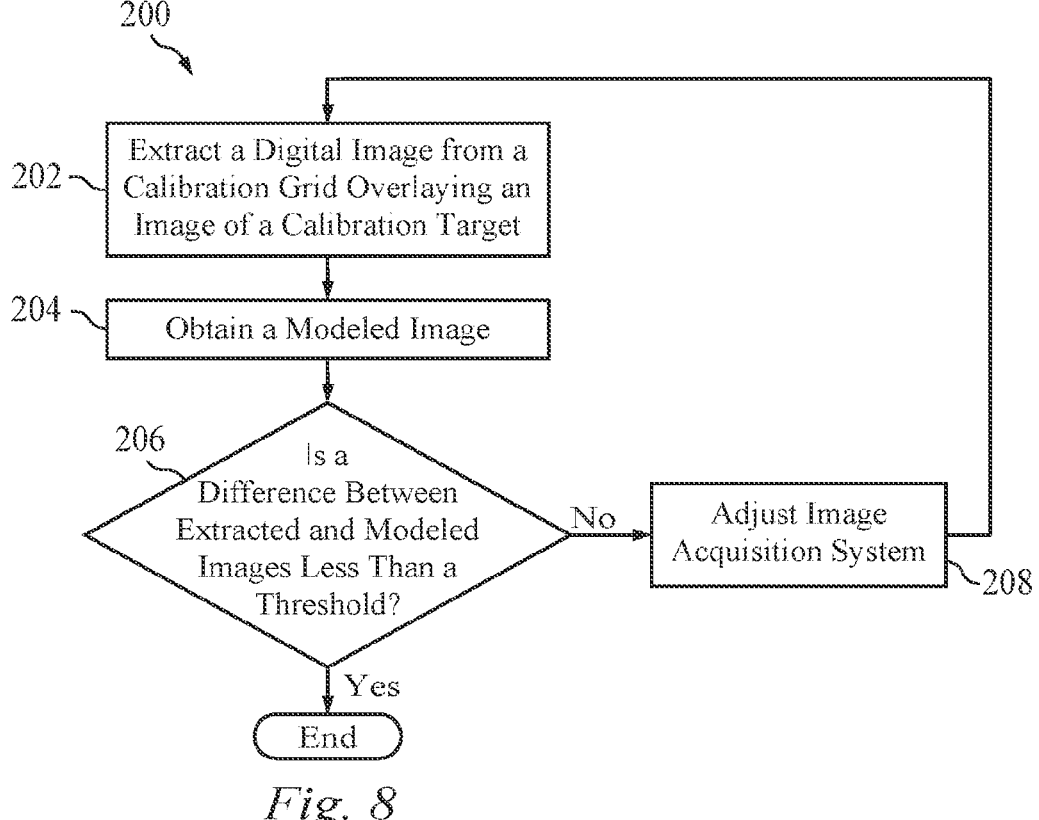
FIG. 8 depicts a flow chart of one example method for calibrating the image acquisition device shown on FIG. 5.

Turning now to FIG. 8, and with further reference to FIG. 5, a flow chart of one example method 200 for automatically calibrating the image acquisition device 100 for acquiring calibrated digital images is disclosed. The software module 140 (FIG. 6) may further include an automated image calibration block or a calibration routine may be stored in the image preprocessing block 146. A calibration target may be placed at a predefined location and in a predefined orientation on tray 114 and the calibration procedure initiated (e.g., via the user interface). Substantially any suitable calibration target may be utilized, for example, including the Rez Checker target available from Imatest (www.imatest.com/product/rez-checker/).

A digital image of the calibration target may be acquired and one or more image segments (or blocks) may be extracted from corresponding calibration regions in a calibration grid overlaying the digital image at 202. The calibration regions are generally predefined and correspond to known edge, color, and/or greyscale regions in the calibration target. Modeled (synthetic) image segments are obtained (or computed) at 204 for the corresponding region (s) of the calibration grid. The modeled image segments may be obtained using substantially any suitable techniques depending on the calibration grid region as described in more detail below and are generally stored in memory in the image acquisition device 100. The modeled image(s) obtained at 204 may include reference colors (e.g., including reference red, green, and blue values) corresponding to particular ones of the calibration regions, reference intensities (or shades of grey) corresponding to other ones of the calibration regions, and/or modeled edge or wedge images corresponding to still other calibration regions in the calibration target.

Method 200 further includes comparing the extracted image segments extracted and modeled image segments at 206. When a difference (or differences) between the image segment(s) and the modeled image(s) is/are less than the threshold, the image acquisition system is taken to be optimized (or calibrated). When the difference (differences) is/are greater than the threshold, the image acquisition system is adjusted at 208. The method may then return to 202 and the acquisition of another calibration target image. The adjustment(s) to the image acquisition system at 208 may advantageously include updates to camera settings such as the exposure time and RGB gains, however, the disclosed embodiments are not limited in this regard as other adjustments may include, for example, lens settings such as focal plane adjustment and light intensity adjustments.

With continued reference to FIG. 8, comparing the extracted and modeled image segments at 206 may include comparing a single (unitary) extracted image segment and a corresponding single (unitary) modeled image segment or may include comparing a plurality of extracted image segments (e.g., of a plurality of calibration regions) with a corresponding plurality of modeled images. For example, image segments of each of a plurality of colored calibration regions may be compared with corresponding modeled images of each of the same colored calibration regions. In such an embodiment, the comparison may include computing a sum (or weighted sum) of the differences between the acquired image segments and the modeled image segments and comparing the result with a corresponding threshold. In another embodiment, image segments of a plurality of grey calibration regions may be compared with corresponding modeled image segments of each of the same grey scale calibration regions. In still another embodiment, one or more image segments of edge or wedge regions may be compared with corresponding modeled images to compute a spatial resolution of the image acquisition system which may then be compared with a corresponding threshold.

Modeled edge images may be computed, for example, using a mathematical model. The modeled image may be computed using substantially any suitable mathematical relations, for example, including a Bessel function or a Gaussian function. A difference between the image segment and the modeled image may be minimized by adjusting model parameters to estimate the spatial resolution of the digital imaging system (e.g., a spatial frequency resolution). For example, the modulation transfer function 50% (MTF50) is one measure of the spatial frequency response of an imaging system (and is an indicator of image sharpness). The calibration procedure may require an MTF50 to exceed a predefined threshold to ensure good focus. Otherwise, the system may be adjusted (e.g., by adjusting lens focus) and the calibration repeated to evaluate the spatial resolution (e.g., the spatial frequency response of the system).

The calibration may further include calibrating image color and brightness properties. For example, the calibration may evaluate the saturation of the colored image segments as compared to the modeled (or ideal) saturation as well as the brightness or intensity of grey scale image segments as compared to the modeled brightness. In one example embodiment, the calibration may automatically update or adjust the image exposure time until the saturation and/or brightness is within a threshold of the modeled saturation and/or brightness. For example, the exposure time may be decreased if the saturation or brightness exceeds the modeled saturation or brightness. The calibration may further compute a Delta E (e.g., a Delta E00) of the colored image segments and compare the computed value with the modeled Delta E (it will be appreciated that Delta E is a standard measure of the difference between displayed colors). In one example embodiment, the calibration may automatically update or adjust the RGB gains in the digital camera until the computed Delta E is within satisfactory limits of the modeled Delta E. As shown in FIG. 8, this automated calibration process may be repeated until an acceptable calibration is achieved. While, the method 200 may further include reporting the calibration results to a user or saving them to memory.

It will be understood that the present disclosure includes numerous embodiments. These embodiments include, but are not limited to, the following embodiments.

In a first embodiment, an apparatus for acquiring a digital image of a drill cuttings sample obtained during a subterranean drilling operation, the apparatus comprising a housing defining an image acquisition chamber; a tray deployed in the image acquisition chamber and configured to receive the drill cuttings sample; a light deployed in the image acquisition chamber and disposed to illuminate the tray; a digital camera deployed in the image acquisition chamber and configured to acquire a digital image of the cuttings sample; and an electronic controller configured to automatically turn the light on and off, instruct the digital camera to acquire a digital image of the drill cuttings when the light is on, and to save the digital image to digital memory or transfer the digital image to an external computing device.

A second embodiment may include the first embodiment, wherein the light comprises a first white light and a second ultraviolet light deployed in the image acquisition chamber and disposed to illuminate the tray.

A third embodiment may include the second embodiment, wherein the electronic controller is further configured to (i) update settings in the digital camera for acquiring a white light image; (ii) instruct the digital camera to record a first digital image of the drill cuttings sample; (iii) update the settings in the digital camera for acquiring an ultraviolet light image; (iv) turn off the first white light and turn on the second ultraviolet light; (v) instruct the digital camera to record a second digital image of the drill cuttings sample; (vi) turn on the first white light and turn off the second ultraviolet light; and (vii) transfer the first and second digital images of the drill cuttings to the external computing device.

A fourth embodiment may include any one of the first through third embodiments, wherein the housing further defines a service chamber located above the image acquisition chamber; and the electronic controller is deployed in the service chamber.

A fifth embodiment may include the fourth embodiment, wherein the digital camera is deployed on a divider that is disposed between the image acquisition chamber and the service chamber, wherein the digital camera includes a lens that extends downwards into the image acquisition chamber and at least one connector port is disposed in the service chamber.

A sixth embodiment may include any one of the first through fifth embodiments, further comprising a hatch that provides access to the image acquisition chamber, wherein the electronic controller is configured to automatically turn on the light when the hatch is open.

A seventh embodiment may include any one of the first through sixth embodiments, wherein the electronic controller comprises an image pre-processing module configured to automatically adjust settings on the digital camera.

An eighth embodiment may include the seventh embodiment, wherein the image pre-processing module is configured to acquire a digital image of a calibration target; extract at least one image segment from a corresponding calibration region in the calibration target; compare the at least one image segment with a corresponding modeled image segment; and adjust a setting on the digital camera when a difference between the at least one image segment and the corresponding modeled image segment exceeds a threshold.

A ninth embodiment may include any one of the first through eighth embodiments, wherein the electronic controller further comprises an image segmentation module configured to generate a segmented image that identifies individual cuttings particles in the acquired digital image; and an automated lithology module configured to label the identified individual cuttings particles with a lithology type.

A tenth embodiment may include the ninth embodiment, wherein at least one of the image segmentation module and the automated lithology module comprises a trained convolutional neural network.

In an eleventh embodiment, a method for acquiring a digital image of a drill cuttings sample obtained during a subterranean drilling operation includes placing the drill cuttings sample on a tray, the tray deployed in a chamber in an automated image acquisition device including at least one light disposed to illuminate the tray and a digital camera configured to automatically acquire the digital image of the drill cuttings sample; automatically turning on the at least one light; automatically causing the digital camera to acquire the digital image of the drill cuttings sample; and automatically saving the acquired digital image to memory or transferring the acquired digital image to an external computing device.

A twelfth embodiment may include the eleventh embodiment, wherein the automatically causing the digital camera to acquire the digital image further comprises updating settings in the digital camera for acquiring a white light image; using the digital camera to record a first digital image of the drill cuttings sample; updating the settings in the digital camera for acquiring an ultraviolet light image; turning off a white light and turning on an ultraviolet light; using the digital camera to record a second digital image of the drill cuttings sample; turning of the white light and turning on the ultraviolet light; and transferring the first digital image and the second digital image to the external computing device.

A thirteenth embodiment may include any one of the eleventh through twelfth embodiments, further comprising generating a segmented image in which individual cuttings particles in the acquired digital image are identified; and labelling the identified individual cuttings particles in the segmented image with a lithology type label.

A fourteenth embodiment may include any one of the eleventh through thirteenth embodiments, further comprising placing a calibration target on the tray; acquiring a digital image of a calibration target; extracting at least one image segment from a corresponding calibration region in the calibration target; comparing the at least one image segment with a corresponding modeled image segment; and automatically adjusting a setting on the digital camera when a difference between the at least one image segment and the corresponding modeled image segment exceeds a threshold.

A fifteenth embodiment may include the fourteenth embodiment, wherein the setting on the digital camera comprises at least one of an exposure time and a red, green, blue gain.

In a sixteenth embodiment, an apparatus for acquiring a digital image of a drill cuttings sample obtained during a subterranean drilling operation includes a housing defining an upper service chamber and a lower image acquisition chamber; a tray deployed in the lower image acquisition chamber and configured to receive the drill cuttings sample; a white light deployed in the lower image acquisition chamber and disposed to illuminate the tray; an ultraviolet light deployed in the lower image acquisition chamber and disposed to illuminate the tray; a digital camera deployed in the lower image acquisition chamber and configured to acquire a digital image of the cuttings sample; and an electronic controller configured to automatically turn the light on and off, instruct the digital camera to acquire a digital image of the drill cuttings when the light is on, and to save the image to digital memory or transfer the image to an external computing device.

A seventeenth embodiment may include the sixteenth embodiment, wherein the electronic controller is further configured to (i) update settings in the digital camera for acquiring a white light image; (ii) instruct the digital camera to record a first digital image of the drill cuttings sample; (iii) update the settings in the digital camera for acquiring an ultraviolet light image; (iv) turn off the white light and turn on the ultraviolet light; (v) instruct the digital camera to record a second digital image of the drill cuttings sample; (vi) turn on the white light and turn off the ultraviolet light; and (vii) transfer the first and second digital images of the drill cuttings to the external computing device.

An eighteenth embodiment may include any one of the sixteenth through seventeenth embodiments, wherein the digital camera is deployed on a divider that is disposed between the lower image acquisition chamber and the service chamber, wherein the digital camera includes a lens that extends downwards into the lower image acquisition chamber and at least one connector port disposed in the service chamber.

A nineteenth embodiment may include any one of the sixteenth through eighteenth embodiments, wherein the electronic controller comprises an image pre-processing module configured to acquire a digital image of a calibration target; extract at least one image segment from a corresponding calibration region in the calibration target; compare the at least one image segment with a corresponding modeled image segment; and adjust a setting on the digital camera when a difference between the at least one image segment and the corresponding modeled image segment exceeds a threshold.

A twentieth embodiment may include any one of the sixteenth through nineteenth embodiments, wherein the electronic controller further comprises an image segmentation module configured to generate a segmented image that identifies individual cuttings particles in the acquired digital image; and an automated lithology module configured to label the identified individual cuttings particles with a lithology type.

Although an automated device for drill cuttings image acquisition has been described in detail, it should be understood that various changes, substitutions and alternations can be made herein without departing from the spirit and scope of the disclosure as defined by the appended claims.

The invention claimed is:

1. An apparatus for acquiring a digital image of a drill cuttings sample obtained during a subterranean drilling operation, the apparatus comprising:

a housing defining an image acquisition chamber and a service chamber;

a divider disposed in the housing and fixed in position relative to the housing and separating the image acquisition chamber from the service chamber;

a tray deployed in the image acquisition chamber and configured to receive the drill cuttings sample;

a light deployed in the image acquisition chamber and disposed to illuminate the tray;

a digital camera comprising a lens and a connector port, wherein the digital camera is deployed through the divider such that the lens is disposed in the image acquisition chamber and configured to acquire the digital image of the drill cuttings sample and the connector port is disposed in the service chamber; and an electronic controller configured to automatically turn the light on and off, instruct the digital camera to acquire the digital image of the drill cuttings sample when the light is on, and to save the digital image to digital memory or transfer the digital image to an external computing device.

2. The apparatus of claim 1, wherein the light comprises a first white light and a second ultraviolet light deployed in the image acquisition chamber and disposed to illuminate the tray.

3. The apparatus of claim 2, wherein the electronic controller is further configured to (i) update settings in the digital camera for acquiring a white light image; (ii) instruct the digital camera to record a first digital image of the drill cuttings sample; (iii) update the settings in the digital camera for acquiring an ultraviolet light image; (iv) turn off the first white light and turn on the second ultraviolet light; (v) instruct the digital camera to record a second digital image of the drill cuttings sample; (vi) turn on the first white light and turn off the second ultraviolet light; and (vii) transfer the first digital image of the drill cuttings sample and the second digital image of the drill cuttings sample to the external computing device.

4. The apparatus of claim 1, wherein the electronic controller is deployed in the service chamber.

5. The apparatus of claim 1, further comprising a hatch that provides access to the image acquisition chamber, wherein the electronic controller is configured to automatically turn on the light when the hatch is open.

6. The apparatus of claim 1, wherein the electronic controller comprises an image pre-processing module configured to automatically adjust settings on the digital camera.

7. The apparatus of claim 6, wherein the image pre-processing module is configured to:

acquire a digital image of a calibration target;

extract at least one image segment from a corresponding calibration region in the calibration target;

compare the at least one image segment with a corresponding modeled image segment; and adjust a setting on the digital camera when a difference between the at least one image segment and the corresponding modeled image segment exceeds a threshold.

8. The apparatus of claim 1, wherein the electronic controller further comprises:

an image segmentation module configured to generate a segmented image that identifies individual cuttings particles in the digital image; and an automated lithology module configured to label the individual cuttings particles with a lithology type.

9. The apparatus of claim 8, wherein at least one of the image segmentation module and the automated lithology module comprises a trained convolutional neural network.

10. The apparatus of claim 1, wherein the housing comprises:

a first hatch defining the service chamber and configured to provide a first access to the service chamber; and a second hatch defining the image acquisition chamber and configured to provide a second access to the image acquisition chamber.

11. The apparatus of claim 1, wherein the divider extends substantially across an entire area within the housing between the image acquisition chamber and the service chamber.

12. A method for acquiring a digital image of a drill cuttings sample obtained during a subterranean drilling operation, the method comprising:

placing the drill cuttings sample on a tray, the tray deployed in a first chamber in an automated image acquisition device including:

a housing defining the first chamber and a second chamber;

a divider disposed in the housing and fixed in position relative to the housing and isolating the first chamber from the second chamber;

at least one light disposed in the first chamber and configured to illuminate the tray; and a digital camera configured to automatically acquire the digital image of the drill cuttings sample, the digital camera comprising a lens and a connector port, wherein the digital camera is disposed through the divider such that the lens is disposed in the first chamber and the connector port is disposed in the second chamber;

automatically turning on the at least one light;

automatically causing the digital camera to acquire the digital image of the drill cuttings sample; and automatically saving the digital image to memory or transferring the digital image to an external computing device.

13. The method of claim 12, wherein the automatically causing the digital camera to acquire the digital image further comprises:

updating settings in the digital camera for acquiring a white light image;

using the digital camera to record a first digital image of the drill cuttings sample;

updating the settings in the digital camera for acquiring an ultraviolet light image;

turning off a white light and turning on an ultraviolet light;

using the digital camera to record a second digital image of the drill cuttings sample;

turning off the white light and turning on the ultraviolet light; and transferring the first digital image and the second digital image to the external computing device.

14. The method of claim 12, further comprising:

generating a segmented image in which individual cuttings particles in the digital image are identified; and labelling the individual cuttings particles in the segmented image with a lithology type label.

15. The method of claim 12, further comprising:

placing a calibration target on the tray;

acquiring a digital image of the calibration target;

extracting at least one image segment from a corresponding calibration region in the calibration target;

comparing the at least one image segment with a corresponding modeled image segment; and automatically adjusting a setting on the digital camera when a difference between the at least one image segment and the corresponding modeled image segment exceeds a threshold.

16. The method of claim 15, wherein the setting on the digital camera comprises at least one of an exposure time and a red, green, blue gain.

17. An apparatus for acquiring a digital image of a drill cuttings sample obtained during a subterranean drilling operation, the apparatus comprising:

a housing defining an upper service chamber and a lower image acquisition chamber;

a divider disposed in the housing and fixed in position relative to the housing and separating the lower image acquisition chamber from the upper service chamber;

a tray deployed in the lower image acquisition chamber and configured to receive the drill cuttings sample;

a white light deployed in the lower image acquisition chamber and disposed to illuminate the tray;

an ultraviolet light deployed in the lower image acquisition chamber and disposed to illuminate the tray;

a digital camera comprising a lens and a connector port, wherein the digital camera is deployed through the divider such that the lens is disposed in the lower image acquisition chamber and configured to acquire the digital image of the drill cuttings sample and the connector port is disposed in the upper service chamber; and an electronic controller configured to automatically turn the white light on and off, instruct the digital camera to acquire the digital image of the drill cuttings sample when the white light is on, and to save the digital image to digital memory or transfer the digital image to an external computing device.

18. The apparatus of claim 17, wherein the electronic controller is further configured to (i) update settings in the digital camera for acquiring a white light image; (ii) instruct the digital camera to record a first digital image of the drill cuttings sample; (iii) update the settings in the digital camera for acquiring an ultraviolet light image; (iv) turn off the white light and turn on the ultraviolet light; (v) instruct the digital camera to record a second digital image of the drill cuttings sample; (vi) turn on the white light and turn off the ultraviolet light; and (vii) transfer the first digital image of the drill cuttings sample and the second digital image of the drill cuttings sample to the external computing device.

19. The apparatus of claim 17, wherein the electronic controller comprises an image pre-processing module configured to:

acquire a digital image of a calibration target;

extract at least one image segment from a corresponding calibration region in the calibration target;

compare the at least one image segment with a corresponding modeled image segment; and adjust a setting on the digital camera when a difference between the at least one image segment and the corresponding modeled image segment exceeds a threshold.

20. The apparatus of claim 17, wherein the electronic controller further comprises:

an image segmentation module configured to generate a segmented image that identifies individual cuttings particles in the digital image; and an automated lithology module configured to label the individual cuttings particles with a lithology type.

* * * * *